July 6, 1965 A. B. SMITH 3,192,689
AIR SCRUBBING DEVICE
Filed April 25, 1963 2 Sheets-Sheet 1

INVENTOR
Avery B. Smith
BY Spencer, Rockwell & Bartholow
ATTORNEYS

July 6, 1965 A. B. SMITH 3,192,689
AIR SCRUBBING DEVICE
Filed April 25, 1963 2 Sheets-Sheet 2

INVENTOR
Avery B. Smith
BY Spencer, Rockwell & Bartholow
ATTORNEYS

United States Patent Office 3,192,689
Patented July 6, 1965

3,192,689
AIR SCRUBBING DEVICE
Avery B. Smith, 6 Doris St., Wallingford, Conn.
Filed Apr. 25, 1963, Ser. No. 275,626
8 Claims. (Cl. 55—229)

This invention relates generally to an air scrubbing device and more particularly to a device for scrubbing or separating contaminants from air to clean and purify the air within a building and to clean the air before it is exhausted to the outside. The invention is directed to a device which can be utilized to clean air without requiring expensive and elaborate equipment.

The problems of air pollution have become increasingly serious in recent years due to the increase in factory facilities and the congestion in certain areas and also due to the substantial increase in automobiles and other vehicles exhausting contaminated air to the atmosphere. During adverse weather conditions contaminated air has stagnated in certain areas causing discomfort to residents of the area and a hazard to health. All concerned have become increasingly more aware of the problem and need for substantial control. Legislation and ordinances have been passed in some areas and are being considered in others. In industrial applications, one of the major problems is the cost of adequate systems to clean the air of contaminants before it is exhausted to the atmosphere.

As an example, a large plating facility may have a number of tanks carrying baths which generate noxious contaminants. For the health of those employed, it is necessary to exhaust the air. Usually, large and complex ducting and exhaust facilities are required to withdraw the air and pass it through an air-cleaning unit before it is exhausted to the atmosphere. Known systems are quite expensive and have been beyond the means of small plants and job shops. For this reason, legislators have been reluctant to impose and enforce stringent regulations relating to air pollution since such regulations would be likely to force smaller enterprises out of business.

In some applications, it has been found permissible to exhaust certain areas of the plant without the necessity of decontaminating the air, while in other areas, the exhausted air must be decontaminated. In order to do this, and in order to keep the size of the air-decontaminating facility to a minimum, it has been found necessary and desirable to install two complete exhaust facilities with only one being fed through the decontamination station. As may well be imagined, the duplication of the exhaust facility adds substantially to the cost of the system.

Accordingly, an object of this invention is to provide an improved air scrubbing device which may be inexpensively fabricated and will operate efficiently to clean contaminants from air in close proximity to the required location.

Another object of the invention is to provide an air scrubbing device which may be readily located adjacent the air contaminating system to withdraw the contaminated air and permit it to be fed into an existing system of uncontaminated freely exhausted air.

A further object of the invention is to provide an air scrubbing device which may be mounted adjacent a container generating contaminated air to exhaust and decontaminate the air adjacent the container.

Still another object of the invention is to provide a device which can be mounted adjacent a fluid tank for withdrawing contaminated air from the area of the surface of the tank and scrubbing the air at that location.

Still another object of the invention is to provide an air scrubbing device which will exhaust and scrub air so that it may be fed into an exhaust system carrying uncontaminated air.

Still other objects and advantages of the invention will in part be obvious and will in part be apparent from the specification.

Generally speaking, in accordance with this invention, a unit is provided adapted to be mounted adjacent a container carrying acid or alkaline or other material which gives off fumes contaminating the air. The unit is constructed to draw the contaminated air therethrough and scrub the air so that it is decontaminated during its passage through the unit. Scrubbing is by means of a fluid which is deflected so that it will not be exhausted with the air and will not mix with the acid or alkaline solution in the container.

The invention accordingly comprises the features of construction, combinations of elements, and arrangement of parts which will be exemplified in the constructions hereinafter set forth, and the scope of the invention will be indicated in the claims.

For a fuller understanding of the invention, reference is had to the following description taken in connection with the accompanying drawings, in which.

Figure 1:
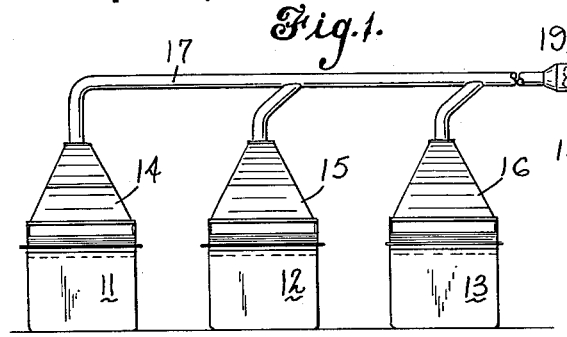
FIG. 1 is an elevational view of a typical three-tank installation into which one or more of the devices of the invention may be incorporated.

FIG. 1 is illustrative of a typical environment in which the invention to be hereinafter described may be incorporated to the greatest advantage. By way of example, FIG. 1 schematically shows a relatively small plating shop having a three-tank set-up. The tanks are indicated at 11, 12 and 13. Since the air at the surface of each tank may stagnate, it may be desirable to exhaust the air across the surface of each of the tanks. For this purpose, three hoods, 14, 15 and 16 are provided at each of the tanks and each hood feeds into a single duct 17 which may exhaust the air to the outside of the building indicated at 18. An exhaust fan 19 would be provided to draw the air through the duct from each of the hoods. Consider now that tank 11 carries an acid or alkaline or other solution which gives off fumes and contaminates the air. It is highly undesirable to exhaust the contaminated air to the outside of the building since this constitutes a health hazard and may also be in violation of local ordinances. It would not be desirable to mix the contaminated air drawn in by hood 14, for example, with the uncontaminated air drawn in by hoods 15 and 16 and then have the air decontaminated or scrubbed at some location near the building exhaust since this would require an unnecessarily large scrubbing facility to scrub, in this case, three times the amount of air. Another alternative would be to exhaust tanks 12 and 13 directly to the outside and build a separate exhaust system for tank 11, the separate system incorporating an air scrubber. As can be well imagined, this would double the expense of the ducting facilities.

Figure 2:
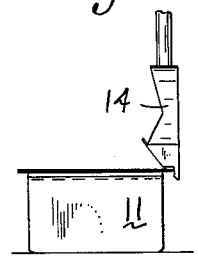
FIG. 2 is a side elevational view of one form of the invention mounted adjacent a tank such as a plating tank.

However, by utilizing a hood 14 constructed in accordance with the invention and mounted with relation to the tank as shown in FIG. 2, the air can be scrubbed before it enters duct 17 so that all air passing through the duct and being exhausted is non-contaminated. In such a manner, the air drawn up by hood 14 may be freely mixed with the air drawn up by hoods 15 and 16.

Figure 3:
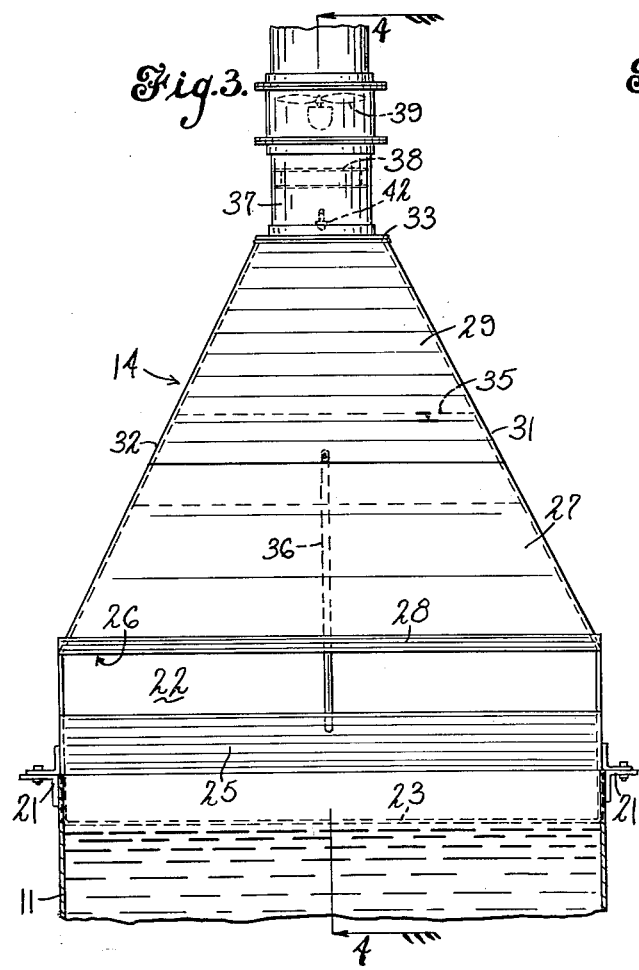
FIG. 3 is an elevational view of one form of the invention mounted to a tank, the tank being shown as a partial, sectional view.
Figure 4:
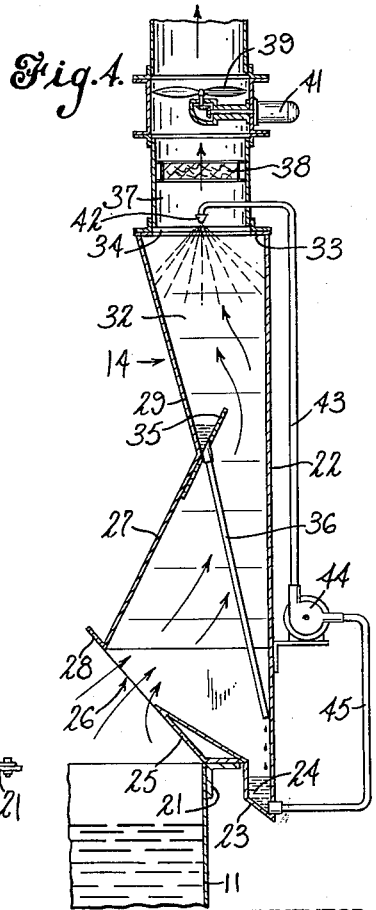
FIG. 4 is a sectional side elevational view taken along line 4—4 of FIG. 3.

The hood or device indicated generally as 14 in FIGS. 1 and 2, is shown in greater detail in FIGS. 3 and 4. A preferred embodiment of the invention is shown in FIGS. 3 and 4 mounted to tank 11 by means of flanges 21. Device 14 is fabricated as follows: A rear wall 22 extends the entire heighth of the scrubbing portion of the device and, preferably, extends below the top edge of tank 11. Since the tank is usually substantially wider than the duct system into which the air is exhausted, the device will normally be approximately the same width as the tank at the bottom and taper to a smaller size at the top. Rear wall 22 follows this configuration which may best be seen in FIG. 3.

The front wall comprises a plurality of sections and is joined to the rear wall by means of a bottom section 23. The bottom section 23 extends from rear wall below the top edge of the tank and defines a chamber 24 whose use will be hereafter indicated. The front wall consists of a first section 25 having any suitable configuration to permit the device to be mounted to the tank but slopes upwardly away from the rear wall over the top surface of the tank. An opening 26 is then provided in the front wall, opening 26 extending at least the entire width of the tank to allow the maximum amount of air to be drawn into the device. The upper edge of opening 26 is defined by second section 27 which slopes upwardly and rearwardly toward the rear wall to narrow the cross sectional size of the chamber. At its lower edge adjacent opening 26, second section 27 carries a lip 28 extending the width of the device and sloping upwardly along the line of the front face of first section 25. The front face extends outwardly from the top edge of second section 27 as a third section 29. Third section 29 slopes upwardly and away from rear wall 22. It should also be borne in mind that second section 27 and third section 29 taper inwardly toward the top of the scrubbing chamber of the device as shown in FIG. 3. First section 25, second section 27 and third section 29 taken together with rear wall 22 and solid side walls 31 and 32 define the scrubbing chamber of the device. A top section 33, having a large aperture 34 therethrough is secured to the walls and defines the top of the scrubbing chamber.

A baffle plate 35 is secured to second section 27 and extends upwardly at the same angle. The baffle plate extends the entire width of the device within the scrubbing chamber. Attached to baffle plate 35 is a drain tube 36 having a passage which communicates with the trough formed between baffle plate 35 and third section 29. Drain tube 36 extends downwardly toward chamber 24 and, as may be seen in FIG. 4, drains any fluid collected by the baffle plate into chamber or sump 24. A cylindrical duct 37 is mounted to top section 33 and communicates with aperture 34 to draw off the scrubbed air. Mounted within the cylinder may be a filter 38 which may be specifically adapted to remove solid particles or moisture from the air. Also depicted as mounted within duct 37 is a fan 39 driven by a motor 41.

As will be readily understood, the fan will create a drop in pressure thereacross to draw air into the device through opening 26 and exhausted out of the top of the device. Of course, it is not necessary to mount fan 39 at the location indicated in FIGS. 3 and 4. As is shown in FIG. 1, exhaust fan 19 is located within the duct system adjacent the outside wall of the building. This fan, which would have a larger volume than fan 39, would draw air through all branches of the ducting system. The only requirement is that a fan or other air moving device be provided to cause air to be drawn through the air scrubbing chamber.

To scrub or wash the air, a nozzle 42 is mounted at the top of the air scrubbing chamber and may be mounted within duct 37. If the duct is circular, a full cone spray nozzle may be utilized to cause fluid to be radiated in all directions to minimize the amount of air that may pass through the device without being washed. Nozzle 42 would be fed through a pipe 43 from a pump 44 and, if it is desirable to recirculate the fluid, inlet of pump 44 can communicate with sump 24 through a pipe 45. Of course, it should be readily understood that it is not necessary to recirculate the fluid, the only mandatory requirement being that the desired fluid be fed to nozzle 42 under pressure. In fact, if the air being scrubbed is likely to carry contaminants having a value such as gold-dust or the like, the fluid in the sump could be drained off and the desirable materials reclaimed.

The washing solution may be water or any other desirable solution and if the fumes are acidic or alkaline, it may be desirable to utilize a fluid which will normalize the pH of the washed precipitants.

Figure 5:
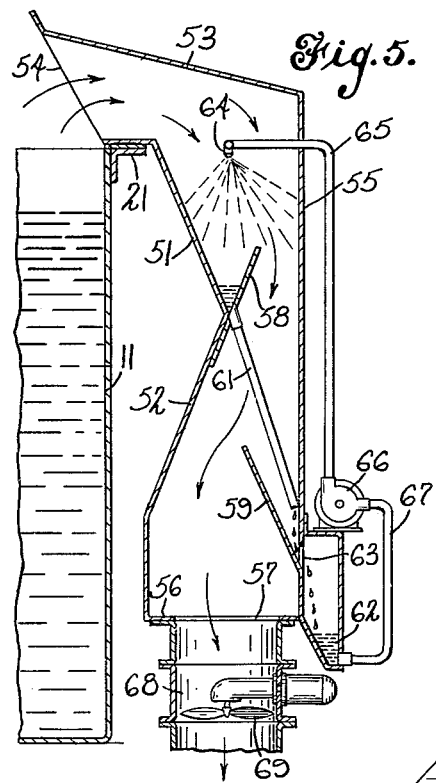
FIG. 5 is a sectional view similar to FIG. 4, but showing an alternate form of construction of the invention.

While the device shown in FIGS. 3 and 4 may be considered of the updraft type, the construction shown in FIG. 5 would be of the downdraft type. In the downdraft type, an upper front wall 51 is mounted to flange 21 of tank 11 and extends downwardly and away from the rear of the tank. A lower front wall 52 extends from the bottom edge of the upper front wall and slopes downwardly and toward the tank along a portion of its length and parallels the tank as it approaches its bottom edge. A top 53 is mounted over a portion of the tank and slopes downwardly toward the rear defining an opening 54 through which the air may enter. A rear wall 55 extends downwardly from the rear edge of top 53 substantially paralleling the tank, and the rear wall and lower front wall are joined at the bottom by a bottom section 56 having a circular aperture 57 therethrough. A baffle plate 58 is mounted to lower front wall 52 within the chamber formed between the front and rear walls, and the baffle plate extends upwardly above the junction between upper front wall 51 and lower front wall 52 at approximately the same angle as the lower front wall. As shown in FIG. 5, the baffle forms a trough which will collect a portion of the washing fluid. A second trough is formed in the lower part of the chamber by means of a baffle plate 59 extending upwardly from the rear wall along the entire width of the device. In vertical projection, baffle plate 58 substantially overlies baffle plate 59 so that all fluids will be caught in one of the two troughs. A drain tube 61 is attached to baffle plate 58 and communicates with the trough formed thereby to drain the fluids collected into the trough formed by baffle plate 59. A sump 62 is attached to the outer side of rear wall 55 and communicates with the trough formed by baffle plate 59 by means of an aperture 63. All fluids collected by the two troughs will drain into sump 62. As in the previous construction, the top, bottom and front and rear walls are joined by solid side walls. It is also to be understood that the top portion of the device will extend at least the entire width of the tank. The bottom portion may or may not taper in a fashion similar to the construction of FIG. 3, as desired.

A nozzle 64 is mounted within the upper part of the chamber and is supplied by means of a pipe 65 from a pump 66 which may recirculate the fluid from the sump through a pipe 67. As before, it is also to be understood that it is not necessary that the fluid be recirculated. Nozzle 64 could be of the full cone type or could be composed of a plurality of nozzles extending the entire width of the device to assure complete saturation of the air entering the device through opening 54. The air being scrubbed will follow a path indicated generally by the arrows in FIG. 5 and will pass out of the bottom of the device through aperture 57. However, all fluids introduced within the chamber by means of the nozzle 64 will fall by gravity into either of the two troughs and the fluids will be drained off through sump 62. The overlap of baffle plates 58 and 59 prevents the fluids introduced by the nozzle from being exhausted from the device along with the scrubbed air. A duct 68 would be mounted on the bottom of the device to carry the air off through an exhaust system. A motor-driven fan 69 may be mounted within the duct to draw the air through the device or, as previously indicated, the exhaust fan may be positioned in another part of the ducting system. The selection of use of updraft or downdraft device is a matter of choice depending upon the particular application, space requirements, and the like.

Figure 7:
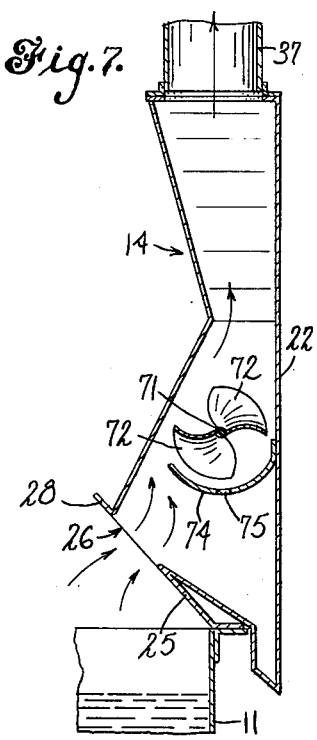
FIG. 7 is a sectional side elevational view taken along line 7—7 of FIG. 6.
Figure 6:
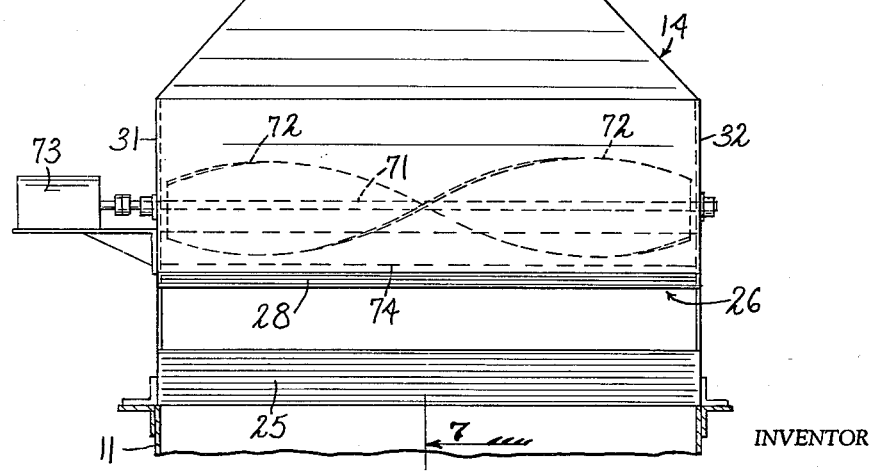
FIG. 6 is a partial front elevaational view of a form of the invention incorporating a modified form of blower.

Novel means for driving the air through the scrubbing device is shown in FIGS. 6 and 7. The novel impeller means are shown, by way of example, as included in the updraft device of FIGS. 3 and 4 although many of the elements have been omitted for clarity. It will be readily understood that the impeller mechanism could be included in the downdraft device or in any other system for moving air. As shown in FIGS. 6 and 7, a central shaft 71 is journalled for rotation between side walls 31 and 32. Central shaft 71 carries two spirally-formed, longitudinally-extending impeller blades 72. A motor 73 may be mounted to side wall 31 and is coupled to central shaft 71 to drive the impeller blades so as to pull air through opening 26 and exhaust it through duct 37. In order to assure a flow of air in the direction indicated in FIG. 7, a curved plate 74 is secured to rear wall 22 and extends the entire width of the device. Air which impinges upon curved plate 74 will be deflected to travel in an upward path. One or more apertures 75 may be provided to drain off any fluid collected on the plate to the sump. If necessary, a drain tube may also be provided to drain fluid from the plate to the sump.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In an air scrubber for association with a tank open at the top to the ambient atmosphere and having therein a substance into which an article may be temporarily placed through said top for treatment by the substance which tends to contaminate the atmosphere above the tank, the improvement including a hood in close proximity to the open top of the tank having the major portion thereof vertically arranged and having a wall structure comprising front, rear and side walls defining an air conduit which is oblong in cross section, the wall structure having means at one end defining an air inlet, closely overhanging a portion of the tank top but leaving a large portion of the open top accessible for the placement of articles in the tank, and having at the other end means defining an air outlet, said air inlet means providing an opening extending horizontally a distance approximating one transverse dimension of said open top and the air inlet being considerably larger than the air outlet, said side walls converging toward one another in the direction of the air outlet, the front wall having an inclined portion tending to entrap any air over the tank tending to enter the air conduit and extending in a direction toward the rear wall, which with the latter and the side walls restricts the air conduit intermediate of its ends, the front wall between said restriction and the means defining the air outlet having a portion inclined in a direction away from the rear wall and extending toward the air outlet, a baffle-like part extending between the side walls in fixed relation thereto forming a further restriction of the air conduit, said baffle-like part defining at least in part a trough, a power-driven air impeller operatively connected to said air conduit on the upstream side of said trough to suck air over the tank into the air conduit and expell it through said outlet, a spray nozzle for connection to a fluid source, located in the air conduit in spaced and opposing relation to said trough to spray substantially all of a cross-sectional area of the air conduit and entrap air contaminants, means defining a fluid deflector and sump spaced below said trough, said sump communicating with the lower end of the air conduit formed by the aforementioned wall structure, said trough overhanging said deflector, and said deflector being arranged to deflect fluid from the nozzle, including that temporarily collected in said trough from the nozzle, to the sump, said baffle-like part and said deflector serving to prevent fluid from the nozzle and any contaminants entrapped in the fluid from entering the tank and serving to direct by gravity any entrapped contaminants to the sump, the restriction of the air conduit, formed at least in part by said baffle-like part providing in itself at least part of the trough, tending to provide a nontortuous air path, and tending to increase the speed of air flow from one part of the air conduit to another to thereby increase the air suction.

2. An air scrubber as defined in claim 1 wherein the deflector forms a lip on the top of the tank.

3. An air scrubber as defined in claim 1 wherein said baffle-like part forming a trough extends into said air-conduit from said rear wall and is of arcuate form in cross section.

4. An air scrubber as defined in claim 3 wherein the air impeller comprises blade means extending substantially the distance between said side walls of the air conduit, said blade means being driven by a shaft supported from said wall structure and extending horizontally, the axis of rotation of said blade means also being horizontally arranged.

5. An air scrubber as defined in claim 1 wherein said baffle-like part has a surface substantially parallel and in close proximity to the first-mentioned inclined portion of the front wall to form in effect an extension of the inner face of the last-mentioned inclined portion.

6. An air scrubber as defined in claim 5 wherein the deflector forms a lip on the top of the tank and has a part which partially defines said air inlet.

7. An air scrubber as defined in claim 5 wherein the trough formed at least in part by the baffle-like part has means defining a drain opening connected to a drain pipe having an open end discharging over the deflector.

8. An air scrubber as defined in claim 7 wherein means is provided to recirculate fluid from the sump to said nozzle.

References Cited by the Examiner
UNITED STATES PATENTS

| | | | |
|---|---|---|---|
| 1,255,518 | 2/18 | Ehrhart | 261—115 |
| 1,557,442 | 10/25 | Eichelman | 55—223 |
| 1,799,084 | 3/31 | Brdar | 261—19 |
| 1,871,022 | 8/32 | Zellweger | 55—260 XR |
| 2,161,122 | 6/39 | Anderson | 55—258 XR |
| 2,180,586 | 11/39 | Gustafsson | 55—241 XR |
| 2,234,735 | 3/41 | Lambert et al. | 55—240 XR |
| 2,257,516 | 9/41 | Roche et al. | 55—229 XR |
| 2,277,368 | 3/42 | Rohlin | 261—160 |
| 2,395,960 | 3/46 | Clark et al. | 55—257 |
| 2,470,345 | 5/49 | Fenn | 55—258 XR |
| 2,545,537 | 3/51 | Addison | 55—242 XR |
| 2,546,259 | 3/51 | Fenn | 55—240 XR |
| 2,643,105 | 6/53 | Lipowitz | 261—126 XR |
| 2,767,806 | 10/56 | Blake | 55—229 XR |
| 3,064,408 | 11/62 | Erga et al. | 55—258 XR |

HARRY B. THORNTON, *Primary Examiner.*